United States Patent [19]

Bryant

[11] 3,918,558

[45] Nov. 11, 1975

[54] FRICTIONLESS BRAKE

[76] Inventor: Clyde C. Bryant, 1920 Forrest Ave., East Point, Ga. 30344

[22] Filed: Nov. 15, 1973

[21] Appl. No.: 416,010

Related U.S. Application Data

[63] Continuation-in-part of Ser. No. 361,633, May 18, 1973.

[52] U.S. Cl. ........... 192/3 R; 180/54 R; 188/264 D; 188/304
[51] Int. Cl.² ......................................... B60K 41/20
[58] Field of Search ........... 188/302, 303, 304, 300, 188/297, 295, 264 R, 264 D; 417/222; 91/505, 506; 137/808–813; 180/54 R; 192/3 R

[56] References Cited
UNITED STATES PATENTS

| | | | |
|---|---|---|---|
| 1,998,087 | 4/1935 | Koch, Jr. | 188/264 R |
| 2,611,248 | 9/1952 | Ahlen et al. | 188/264 R |
| 2,651,386 | 9/1953 | Rossell | 188/300 |
| 3,068,689 | 12/1962 | Warsaw | 188/264 D |
| 3,133,418 | 5/1964 | Froebe | 91/506 |
| 3,290,958 | 12/1966 | Henry-Biabaud | 188/295 |
| 3,324,891 | 6/1967 | Rhoades | 137/812 |
| 3,515,158 | 6/1970 | Utz | 137/812 |
| 3,638,672 | 2/1972 | Smith et al. | 137/813 |
| 3,747,349 | 7/1973 | Weiss | 91/505 |

FOREIGN PATENTS OR APPLICATIONS

| | | | |
|---|---|---|---|
| 543,694 | 9/1922 | France | 188/295 |
| 135,398 | 1/1902 | Germany | 188/295 |

Primary Examiner—Trygve M. Blix
Assistant Examiner—Edward R. Kazenske
Attorney, Agent, or Firm—Gipple & Hale

[57] ABSTRACT

A brake apparatus for a wheeled vehicle comprising a support housing secured to the vehicle upon which is mounted a closed circuit damper brake mechanism. A coupling apparatus having a wobbling motion is connected to the axle of the vehicle to activate the brake damper mechanism with a valve assembly provided on the brake mechanism to regulate the flow of hydraulic fluid through the brake mechanism so that when the flow of fluid through the brake mechanism is stopped, the coupling apparatus motion is stopped prohibiting rotation of the axle causing braking of the vehicle.

6 Claims, 24 Drawing Figures

FRICTIONLESS BRAKE

This is a continuation-in-part of application Ser. No. 361,633, filed on May 18, 1973, for a Frictionless Brake.

BACKGROUND OF THE INVENTION

The present invention generally relates to a fluid non-friction brake and more specifically applies to a fluid brake in which the braking mechanism is applied through the use of a novel damper mechanism used in combination with an axle or drive shaft.

The present invention can be easily adapted to be placed on presently operable automobiles, trucks, trains, airplanes, and other diverse mechanisms such as oil and gas well drilling machines, large motors and other industrial equipment. With the invention's simple sturdy construction, it can inexpensively be adapted to any desired usage. The invention cuts maintenance costs because brake shoes and wheels will not wear out and since there is no friction per se, the inventive brake can be used on many items not specifically identified which are currently on the market.

The invention is particularly useful in that it provides a safe, dependable brake which is cooler and has no heat build-up because of its efficient cooling system, thus removing the hazards of brake fade which currently exist with present commercial brakes. In addition a novel energy storage driving device is contemplated as being used with the invention so that energy generated by the turning of the axle can be saved for future and/or concurrent use with the driving mechanism.

DESCRIPTION OF THE PRIOR ART

In the past railway vehicles, fast moving heavy vehicles, drilling units, motors and other mechanisms have been stopped using several kinds of brakes. All of these brakes have involved the use of a brake shoe or discs being applied to the wheel in the same manner. Initially the brake shoes were hand operated so that the braking force was applied to the wheel by a system of levers worked by a hand wheel mounted on screw spindle.

One presently used brake system currently in use on railway vehicles is a pneumatic brake system which is generally called the Westinghouse brake system after its inventor. Additional development of this system is embodied in the Kuntz Knorr brake in which the brake cylinder comprises two chambers and two coaxial pistons which arrangement enables the brake to be released step by step making for a finer brake control.

Other known brake systems involve the use of brake shoes or discs all of which frictionally engage the wheel which is desired to be braked.

The present invention utilizes a brake which is hydraulically operated and does not use shoes or apparatus which frictionally engages the wheel.

SUMMARY OF THE INVENTION

The basic principle of the frictionless brake invention is that the rotary motion of the axle is transformed into a reciprocal motion with the reciprocal motion being damped and stopped by a hydraulic fluid filled damper brake having an externally operated valve means which when closed, acts upon the reciprocal motion to slow the rotary motion of the axle until the axle ceases to move.

Other features and advantages of the invention will be apparent from the following description of the embodiments of the invention as shown in the accompanying drawings.

BRIEF DESCRIPTION OF THE DRAWINGS

FIG. 11 is an enlarged cross sectional view of the wheel shown in FIG. 8 in a free wheeling position;

FIG. 12 is a side view of the rotor of FIG. 11 as it appears when the brakes are applied;

DESCRIPTION OF THE PREFERRED EMBODIMENTS

Figures 5, 6, 7, 8, 9, 10:
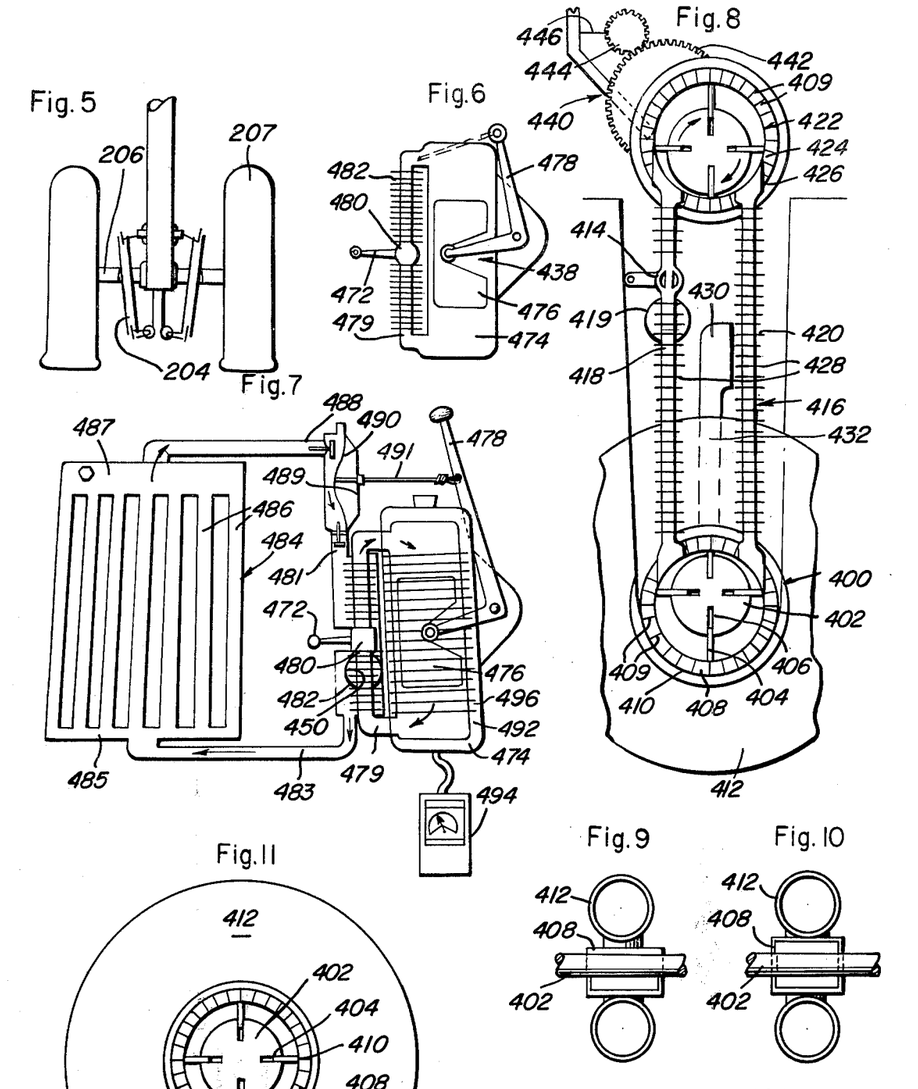
FIG. 5 is a front elevational view of an embodiment of the invention shown in FIG. 2.
FIG. 6 is a planar view of a damper mechanism which can be used with the invention.
FIG. 7 is a planar view partially in section of a cooling system which can be used with the damper shown in FIG. 6.
FIG. 8 is a cross sectional and schematic view of yet another embodiment of the brake invention.
FIG. 9 is a cross sectional representation of the wheel of FIG. 8 being activated for a landing.
FIG. 10 is a cross sectional representation of the wheel of FIG. 8 in a free wheeling position for landing.

In one embodiment of the invention as is shown in FIGS. 5–7 the rotary motion of the wheel and axle is braked by a hydraulic fluid filled brake damper.

In case the brakes should overheat the brake damper itself can be enclosed in a cooling jacket which can be connected to a supply of liquid nitrogen. If the brake overheats a thermostatically controlled regulator valve (not shown) releases liquid nitrogen through a line to the bottom of this jacket. This instantly cools the brake damper housing to a point at which the thermostat closes the regulator valve.

Figures 2, 3, 4:
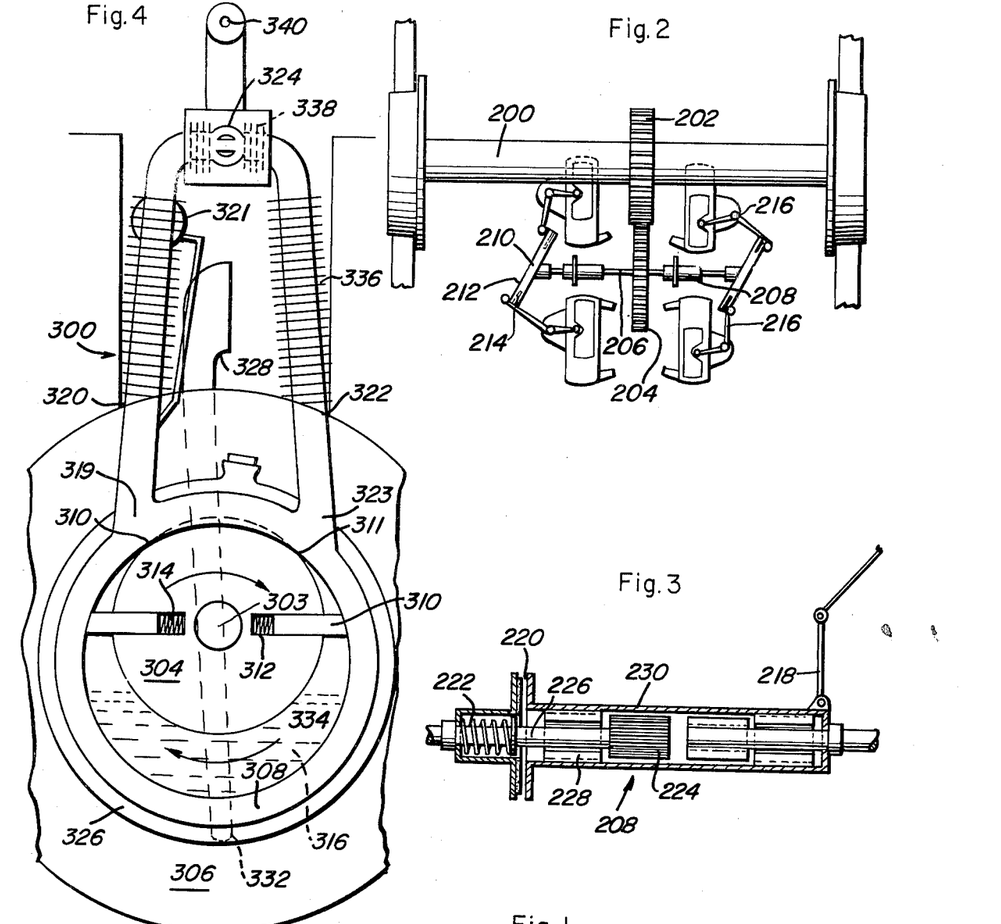
FIG. 2 is a schematic view and partial perspective view of the embodiment of FIG. 1.
FIG. 3 is an enlarged cross sectional view of the clutch mechanism shown in FIG. 2.
FIG. 4 is a cross sectional and schematic view of another embodiment of the brake invention.

The damper brake mechanism as compositely shown in FIGS. 5–7 utilizes the damper brake mechanism of FIGS. 6 or 7 used in conjunction with the swash plate 204 in the same manner as shown in FIG. 2 differing only in that the swash plates 204 are mounted on axle 206 of the wheel housing 207 shown in FIG. 5. Dual damper brake mechanisms are mounted to be connected to each swash plate so that the wobbling motion of the swash plate either directly drives lever 478 of the damper or indirectly drives lever 478 through a suitable linkage (not shown) causing piston 476 to reciprocate in its housing and drive hydraulic fluid through the casing.

One damper brake mechanism as shown in FIG. 6 is constructed of a housing or casing 474 having a piston 476 which moves to and fro in a reciprocal fashion in the fluid filled casing. The wobbling movement of swash plate 204 and the transmitting coupling device is transmitted through piston lever 478 to the piston 476. The movement of the lever 478 causes the piston to reciprocate in the casing forcing the fluid through conduit passage 479 of the housing and valve 480 to the other side of the piston with the direction of flow being reversed when the piston reciprocates in the opposite direction. The damper is double acting with damping intensities in two directions. If desired, a unitary direction of flow can be obtained by forming the piston with a throughgoing passageway having a one way valve which allows the fluid to flow back through the piston on its return rotation. Additionally, one way flow by valving can be constructed on the piston to provide for a single directional flow through the conduit passage 479. In order to cool the casing and conduit passageway 479 a plurality of heat transfer fins 482 are secured to the conduit 479 to dissipate the heat of the hydraulic fluid into the atmosphere.

Additional cooling for the damper brake apparatus is shown in FIG. 7. Positioned adjacent to and surrounding the conduit 479 and its plurality of fins 482 is a water cooled heat exchanger chamber 481. The heat generated by the pumping of the oil is carried away from the conduit 479 through a vortex amplifier power reducer 450 in the radiator inlet conduit 483 into a radiator 484. The radiator 484 is preferably constructed with an entrance header 485 which feeds a plurality of cooling tubes 486 which cool the fluid which has passed over the conduit 479 and carry it into a discharge header 487 which collects the fluid from the cooling tubes 486. A discharge conduit 488 leads from the discharge header into a pumping chamber 489. The pumping chamber 489 has a pump comprising a flexible diaphragm 490 mounted therein which is connected to linkage 491. Linkage 491 or any suitable lever activator is in turn connected to lever 478 which when it is moved to and fro by the wobbling motion of swash plate 204 carried by axle 206 pumps the cooled fluid from the discharge conduit 488 back into the cooling chamber 481. The entrance into the cooling chamber is preferably protected by a one way valve so that only cooled fluid can flow into the chamber and the heated fluid cannot be drawn into the pump chamber. However, other suitable pumps can be used to accomplish the desired results. The damper housing or casing 474 is surrounded by a cooling jacket 492 which can be air cooled, water cooled or cooled by liquid nitrogen. The liquid nitrogen accessory 494 can be installed easily to the jacket. One such accessory that can be used is manufactured and produced by REVCO. It has an adjustable control which will control a valve over any temperature range by setting the control at the desired temperature of activation. Fins 496 are also secured to the cooling jacket so that the air surrounding the jacket can be utilized as a heat exchanger.

Figure 1:
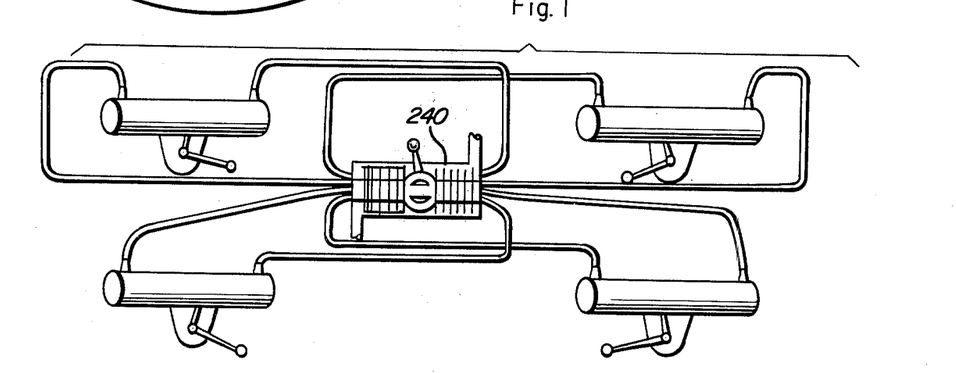
FIG. 1 is a schematic view of an embodiment of a brake system.
Figures 13, 14, 15, 16, 17:
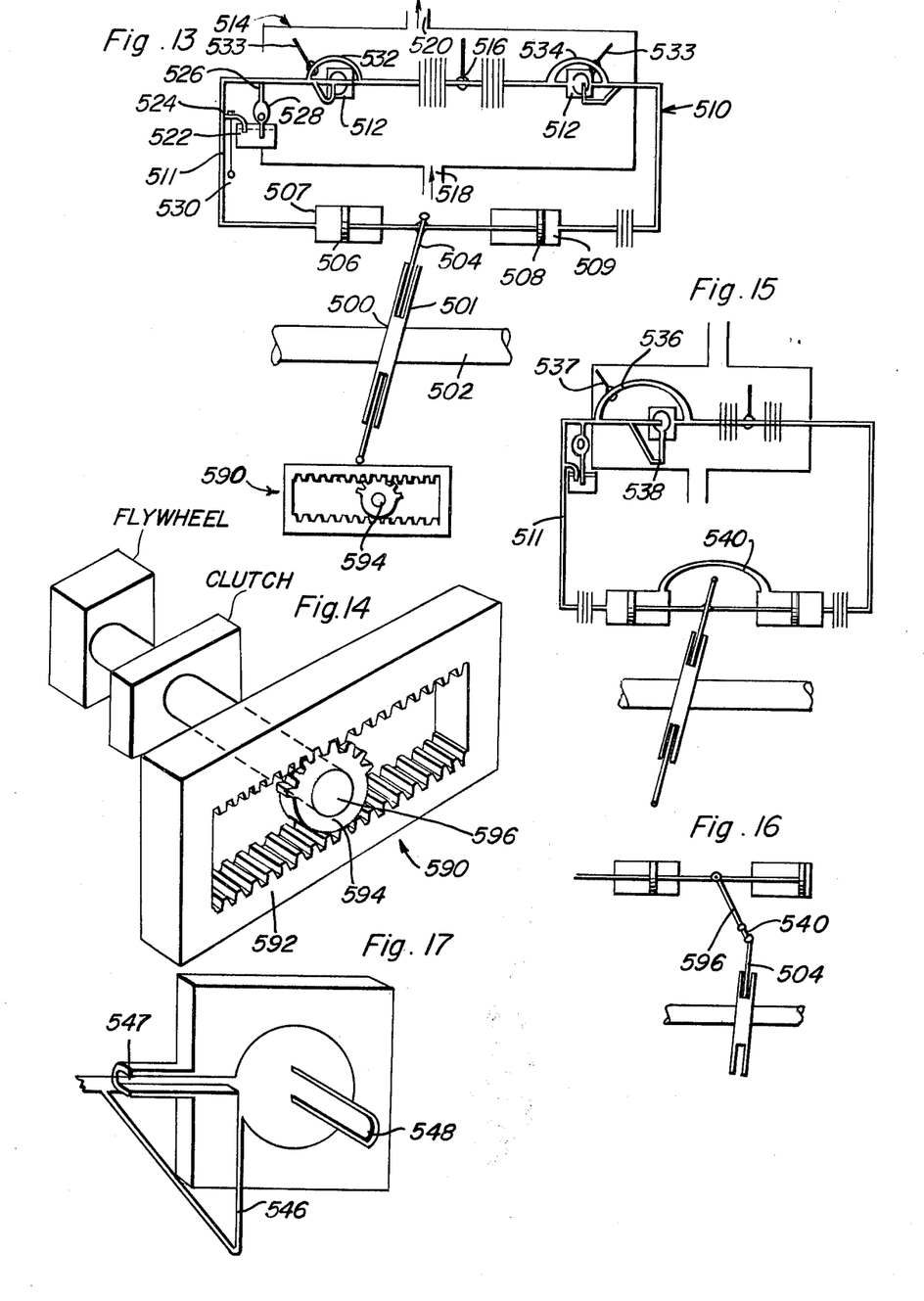
FIG. 13 is a schematic view and partial perspective view of an embodiment of the inventive brake system with an energy storing driving device and fluidic power reducer between the dampers and the shut off valve.
FIG. 14 is an enlarged perspective view of the energy storing driving device of FIG. 13.
FIG. 15 is a schematic view of another embodiment of the inventive brake system.
FIG. 16 is a compound lever mechanism which can be used with the embodiments shown in FIGS. 13, 15 and 24.
FIG. 17 is an enlarged schematic view of a vortex amplifier device used in the invention to reduce the pressure, turbulence and heat at the shut off valve.

Another brake embodiment is shown in FIGS. 1 through 3. FIG. 1 shows a schematic view of the damper, radiator and valve of the invention while FIG. 2 shows a top view of an axle 200 having a large gear 202 around it. Aligned with and matching gear 202 is another gear 204 mounted on drive shaft 206. This gear is preferably a step-up gear which would allow a smaller damper. While the gears shown in the invention are preferably pinion gears, any suitable gearing means can be used to transmit motion from the axle to the drive shaft. The size of the damper needed to absorb the energy of braking can be reduced to any desired size simply by placing a step-up gear at any point between the rotating axle or drive shaft and the motion converter swash plate or offset cam. The size can be additionally reduced by placing a lever between the edge of the swash plate and the damper, thus compounding the action of the swash plate leverage as is shown in FIG. 16. The drive shaft 206 is secured to the second gear 204 and is connected by a standard geared clutch 208 as shown in FIG. 3 to a swash plate 210 of a standard type.

The geared clutch basically comprises two clutch bosses provided with external teeth adapted to mesh with a sleeve that has corresponding internal teeth and is adapted to slide over both bosses to establish a positive connection between the shafts. Other suitable clutches as for example friction clutches, claw clutches and magnetic clutches can be substituted for the geared clutch used.

The swash plate 210 drives at least two of the dampers since the pulsations of the output of the swash plate in this embodiment is preferably equalized. The output flow rate can be varied by tilting the swash plate to change the amount of force placed on the brake damper arms 216. The swash plate 210 drives the reciprocating piston of the brake damper by performing a wobbling rotary motion as it is driven by the axle and associated gear means. The inner plate 212 of the swash plate is connected to the drive shaft 206 by the clutch mechanism 208 and turns with it. The outer plate or ring 214 rides on roller bearings (not shown) and is attached to the piston arms. This outer plate 214 does not rotate but only wobbles in a reciprocal motion.

When the embodiment is used with a train, pressure is released from a main air line of a train and reserve air blows through a valve into a first booster. This first booster pushes or operates a lever 218 which closes the clutch 208. The clutch has a clutch plate 220 which first engages the friction surface of the opposing plate through the action of lever 218 against the action of spring 222 so that the speed of both are equalized before the teeth 224 on the shaft 226 and the teeth inside of the sleeve 230 are brought into mesh. The lever is connected by a rod to a main valve which allows the hydraulic fluid to pass from one end of the damper to the other. This lever is controlled on the train by the Kunz-Knorr control of the Westinghouse brake. As the valve is closed, resistance is offered equally to all four brake dampers 216. In the damper, the fluid flows out through a radiator 240 and into the other end of the damper. The action is reversed when the piston comes back to its original position or can be circulated by use of a one-way valve.

Figures 18, 22, 23:
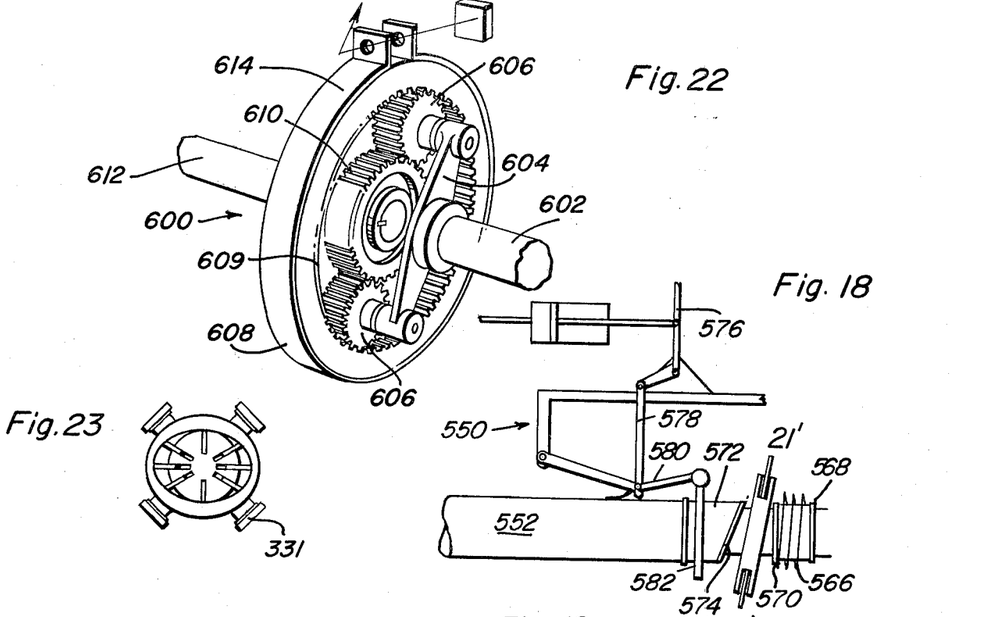
FIG. 18 is a side perspective view of a clutch mechanism which can be used with the invention.
FIG. 22 is an enlarged perspective view of a combined clutch and torque converter mechanism which can be used with the invention.
FIG. 23 is a cross sectional view of a balanced vane damper mechanism which can be used with the invention.
Figure 19:
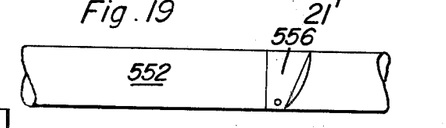
FIG. 19 is a side view of the axle of the clutch mechanism shown in FIG. 18.
Figure 20:
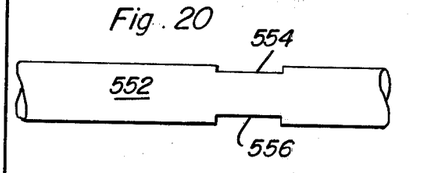
FIG. 20 is a top plan view of the axle shown in FIG. 19.

The present invention can also be adapted to be used as a brake for airplanes. In one embodiment of the invention as is shown in FIG. 4, the brake 300 comprises a rotor 304 mounted to an axle 303. The arrows on the rotor 304 show the direction in which it turns. If desired, the rotor could simply be the axle of the airplane. The axle should be supported on both sides by braces or other suitable structure and have bearings so that it can rotate freely. The tire or wheel 306 illustrated in the drawing of FIG. 4 is not proportionally illustrated as it should be larger in relation to the brake than shown. The brake 300 comprises the rotor 304 mounted concentrically on the axle 303 and positioned eccentrically in a cylindrical stator 308. The contact area of the rotor 304 and the stator 308 is designated by the numeral 311 and preferably comprises a 0.0001 inch clearance which makes a seal and prevents the hydraulic fluid from flowing around the rotor. The contact area can be a cylindrical seat machined into the stator with substantially the same radius as the rotor 304. The contact area or seal is positioned between the inlet 319 of conduit 320 and the outlet 323 of conduit 322. The rotor 304 is preferably fitted with two spring loaded diametrically opposed vanes 310 which move in and out of channels 312 cut in the rotor surface and always press against the inner surface 309 of the stator 308. A strong spring 314 is seated in each channel 312 to force the respective vane 310 outward to its furthermost extent. The wear on the spring loaded vanes 310 is a slight amount because of hydraulic fluid 316 which lubricates all parts of the damper. While only two opposed vanes 310 are disclosed it is to be understood that any number of vanes such as 4, 6, 8, or more can be used in the rotor. If desired, a balanced vane damper 330 as shown in FIG. 23 can be used with a pump chamber 331 on each side with a seal at the top and bottom of the rotor. When the vane 310 leaves the contact area 311, it sweeps the hydraulic fluid from the conduit outlet 323 and forces the fluid around the inner stator surface into the conduit inlet 319 through a fluid passageway comprised of entrance conduit 320 and exit conduit 322. When resistance is offered to the flow of fluid, passing through the conduit passageway by closing valve 324, a braking damping action is offered to the turning of the rotor axle, thus braking the rotor and/or axle. One of the units can be used in a single stage brake damper. If desired a two-stage damper can be used in which two units are connected in parallel and are mounted on a common drive shaft for better ultimate braking. A cooling jacket 326 surrounds the stator 308 to cool the stator and rotor and reduce the heat built up by the continual pumping of hydraulic fluid through the brake system. The cooling jacket can utilize air, water, or liquid nitrogen. In the embodiment shown which is an air cooled jacket, an air scoop 328 connected to an air conduit 330 vents the air into the cooling jacket at vent 332. As the rotor 304 and its associated movable vanes 310 rotates along and carries the hydraulic fluid up through the entrance conduit 320 past the vortex amplifier 321, braking valve 324 and down the exit conduit 322, the hydraulic fluid is heated by the dissipation of energy in the vortex amplifier and by the turbulence at the shut-off valve. Cooling fins 336 are provided around the conduits to provide air cooling of the fluid as it passes along the conduit passageway. Additional cooling is provided by a radiator 338 positioned around the valve means 324 and vortex amplifier if desired to cool the heated pressure built up around the valve when the braking commences. A vortex amplifier which can be used is illustrated by FIG. 17.

A skid sensor control 340 can alternately be connected to either side of the valve means 324 to indicate when the airplane or vehicle starts to skid so that automatic adjustment of the valve means can occur if such is desired. The cooling jacket is preferably constructed in a round configuration to cover the stator. A liquid supply 334 is schematically shown with the cooling jacket if liquid is used to cool the stator. When used on an airplane the cooling jacket would be attached to the landing gear braces or a combination of any suitable structures. In order to operate the brake system the pilot merely activates a valve which sends the fluid through the vortex amplifier and then activates another valve 324 through suitable mechanical or hydraulic means, shutting off the flow of fluid through the brake system so that the rotor vanes cannot propel the hydraulic fluid through the conduit passageway and hydraulic fluid cavity thus reaching an impass causing locking of the axle and associated wheel or wheels resulting in a braking action of the airplane.

Another embodiment of the rotary damper brakes is disclosed in FIGS. 8–12. In this embodiment the rotary brake damper mechanism 400 is constructed with a rotor axle 402 having spring loaded vanes 404 reciprocally mounted in slots 406 cut into the rotor axle surface. The rotor axle 402 is preferably rotatably secured at both ends to the landing gear and supports the plane by wheel 412. The stator and cooling jacket are preferably movably mounted to the landing gear. A shut-off valve 414 is positioned on the fluid brake damper circuit 416 which comprises an inlet conduit 418 and an exit conduit 420 and is operated by the plane antiskid brake control or the pilot's brake control. Positioned above the wheel 412 or horizontal to the wheel and connected to the brake damper circuit 416 is an electric or an air driven pump motor 422 made exactly like the rotary brake damper 400 except that the stator 424 and cooling jacket 426 are immovably mounted. The hydraulic conduit lines 418 and 420 are filled with hydraulic fluid and have cooling fins 428 mounted around them for heat exchange purpose to cool the fluid being pumped through the system. The operation of the brake system is such that when the plane is ready to land the movably mounted stator 408 is moved by a hydraulic lever means (not shown) until the stator 408 is eccentrically positioned to the rotor 402 as is shown in FIGS. 8 and 9 and a contact area is established between the rotor 402 and the upper part of the stator 408 with a clearance of 0.001 inch. During this operation valve 414 is in an open position to remove any hydraulic resistance to the rotor axle turning so that there is a steady flow of fluid pumped through the hydraulic conduit 418 and 420 and around the stator 408. The electric or air motor (not shown) of the pump 422 is started and the fluid is pumped at the desired speed through hydraulic line 420 to the brake damper mechanism 400 which now becomes a hydraulic motor and begins to rotate the wheels in the direction in which the plane is travelling at approximately the same speed as the landing speed of the plane, thus reducing grab and skidding and much of the damage which is presently caused to the tires. The movably mounted stator 408 is then moved to a point where the rotor 402 is concentrically positioned in the stator as shown in FIG. 10. When the rotor is concentrically positioned the motor on the oil pump 314 is turned off leaving the wheels 412 rotating and free wheeling without resistance, as the motor axle is just spinning the fluid around. When the plane touches down and lands, the movably mounted stator 408 is moved upward to the point as shown in FIG. 8 where it is again eccentrical to the axle or rotor with the contact areas and the seal being reestablished. At this point, the hydraulic fluid begins circulating through the system, pumped by the brake damper mechanism 400 with only the resistance of the flow, the vortex amplifier 419 and the pressure required to turn the pump 422.

When the brakes are applied, valve means 414 on the hydraulic line or conduit 418 above the vortex amplifier of the damper brake is moved towards a closed position. This restricts the flow of hydraulic fluid and damps the movement of the wheels 412 and as the valve is closed, and the damping action increases until a complete closure of the valve 414 occurs stopping the turning of the wheels. The wheels cease to turn because the fluid cannot be compressed. The system is additionally cooled by the fins 409 on the stator 408 which expells heat into the cooling jacket. An air scoop 430 is provided which forces air through the scoop conduit 432 into and through the cooling jacket 410 cooling the stator. If more cooling is desired an efficient radiator can be installed around the vortex amplifier power reducer and the shut-off valve. The damper can be water cooled or cooled by a thermostatically controlled liquid nitrogen back up system such as that previously discussed.

An additional feature of the invention is the utilization of a device for driving an energy storage system such as a flywheel or a generator 440 in connection with rotor axle 422. In this embodiment, a gear 442 is rotatably connected to the rotor axle 422 so that as the rotor axle rotates the gear rotates. The gear in turn drives another gear 444 which in turn drives another smaller gear which then can drive an energy storage device such as a flywheel or generator at a high rate of speed. The energy of braking is thus stored and produces much less heat. A planetary gear chain can be used to increase the power upon the driving device further.

The preferred embodiment of the invention shown in FIG. 13 is an opposing damper brake. This preferred embodiment comprises a swash plate 500 and support plate 501 movably secured on an axle or drive shaft 502 at an angle other than 90° and in such manner that the plate rotates with the axle 502. Due to the fact that the plate is at an angle other than 90° on the shaft it wobbles as it rotates. Extending beyond and mounted on the swash plate by ball bearing means or other suitable means is a drive ring 504 which is secured to the opposing pistons 506 and 508 of the dampering mechanism 510. The ring can be secured to the piston rods of the piston by bolting or other suitable means. The ring 504 does not rotate but only reciprocates due to the wobbling motion of the swash plate. As the ring 504 reciprocates it depresses one piston 506 and extends the other piston 508 in the dampers. The cylinders of the dampers are filled with hydraulic fluid. The hydraulic fluid used in the Braking system can be oil, oil and water emulsion, ethylene glycol or other antifreeze compounds, or water. In any situation in which weight and size is critical as for example in an aerospace application, the cooling system of the brake can be eliminated by the use of water as a hydraulic fluid. The rise in temperature in the brake caused by the braking action would add to its efficiency as it would create a greater back pressure on the damper piston. Also a smaller volume of liquid could be used since the brake could be operated to a much higher temperature, since temperatures as high as those occurring in steam engine boilers would be safe. A safety valve could be provided for steam to pop off or escape at a safe level of pressure if water was used in the system.

The hydraulic fluid is pumped from one cylinder through a hydraulic line 511 and one or more vortex amplifier power reducers 512 which can be enclosed in a cooling system or radiator 514 and shut off valve 516 into the opposing cylinder as the ring 504 reciprocates. The radiator 514 can be supported with a steady flow of coolant through inlet 518 which is discharged through outlet 520. The vortex amplifier is shown in FIG. 17. The hydraulic line 511 is connected to a reservoir 522 by conduits 524 and 526. Conduit 526 is provided with a one way valve 528 which allows fluid to flow from the reservoir into the hydraulic line at any time when the pressure in the reservoir is greater than that in the line. Conduit 524 is provided with a valve 530 which is pulled open at the beginning of the decompression stroke to release the slight compression of the fluid into the sealed reservoir which has an air layer. Valve 530 closes on the beginning of a compression stroke as the more compressive air relieves the pressure excited by the less compressible fluid.

In the embodiment of FIG. 13 bypass lines 532 and 534 are equipped with shut-off valves 533 and are positioned on the hydraulic line 511 to allow for fluid to pass by the vortex amplifier. The vortex amplifiers used in the embodiments of the invention as shown by FIG. 17 have a small control jet 546 at the bottom which leads to the main stream 547. The action of the small stream sets the larger power stream to spinning like a tiny whirlpool. The effect greatly reduces the total output of the power stream as it comes out of the axial output tube 548 and to dissipate much of the heat and pressure by converting kinetic energy to calories.

In the embodiment of FIG. 15 a slightly different modification is utilized in which a bypass line 536 is provided on the hydraulic line 511 to allow for fluid to pass by the vortex amplifier 538. A bypass conduit 540 is shown in the pistons which have one way valves placed therein so that the fluid flows in one direction only for better cooling. In this embodiment when the brakes are applied valve 537 is closed as far as necessary. If more braking is required valve 516 is closed as far as is necessary. The other components of the system are the same as described above.

Figure 24:
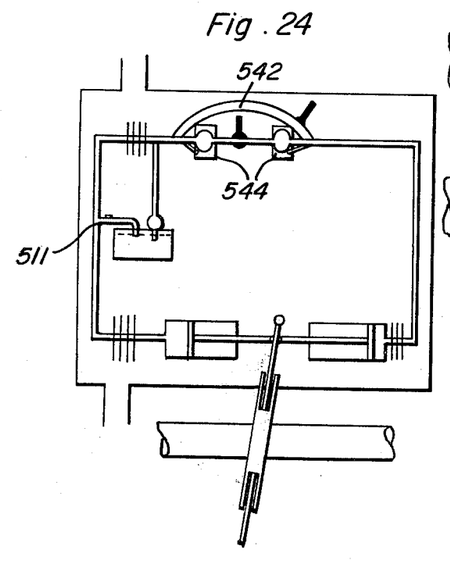
FIG. 24 is a schematic view of another embodiment of the inventive brake system.

In the embodiment shown in FIG. 24 a bypass 542 is utilized with hydraulic line 511 which bypasses the vortex amplifiers 544.

In the invention as described in the previously set forth embodiments, the swash plate is mounted movably on the axle or drive shaft and is keyed to the axle so that it must rotate with it. This plate is fitted with a clutch which changes the angle of the swash plate from 90° to any obtuse angle at the will of the operator. When the plate is at a 90° angle similar to the axle it simply rotates. When the angle is changed the plate rotates and wobbles similar to a swash plate. A ring is mounted on the swash plate and fastened to the connector rods of two or more pistons of the dampers. The ring is kept from rotating by the dampers and its only motion is reciprocating as the plate rotates. As this ring reciprocates it depresses one piston of the damper and extends the piston of another. In the previously disclosed embodiments a bypass valve is provided to channel the fluid around the vortex amplifier when needed. The clutch which will presently be described is engaged which changes the angle of the swash plate from 90° to an obtuse angle and locks the swash plate into place, thus beginning the pumping of fluid through the system. The bypass valve is then closed to force the fluid through the power reducing vortex amplifier which absorbs much of the energy and converts it into heat thus reducing the turbulence and heat and pressure in the valve. If further braking is needed such as would be needed for a complete stop, the shut-off valve is positioned towards a closed position thereby stopping the reciprocating motion of the swash plate which stops the rotation motion of the axle or drive shaft. When the valve is completely closed the axle of the drive shaft will cease to rotate. When the brakes are released, the valves are opened and the swash plate is moved by the clutch shown in FIGS. 18–21 to an angle of 90° with the axle.

Figure 21:
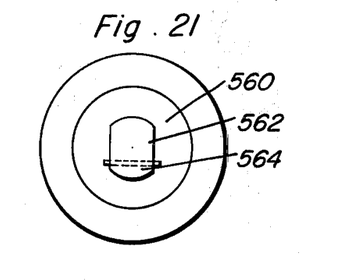
FIG. 21 is an enlarged cross-sectional view taken along lines 21'—21' of FIG. 18.

As previously described, the invention is made with a suitable clutch 550 which can be used to bring the swash plate up to a perpendicular position so that the ring is kept in a vertical plane and does not reciprocate or wobble thereby keeping the dampers from being driven. In the clutch an axle or drive shaft 552 is made with two large grooves 554 and 556 which act to key the swash plate 560 positively to the shaft. The swash plate 560 is machined with the center hole having two large bands 562 to fit the shaft grooves. A pin 564 as shown in FIG. 21 goes through the shaft and engages the plate at a point which allows the plate to change angles from 90° to an obtuse angle.

In the clutch mechanism spring 566 rides on shaft 552 and has one end seated against a ring 568 secured on the shaft and the other end secured to second ring 570, slidably mounted on the shaft and abutting against the swash plate keeping it vertical or at a 90° angle with the shaft during all times that the brakes are not on. On the other side from the swash plate is a slidable sleeve 572 having its leading end 574 cut at the obtuse angle needed for the swash plate operation.

When the brakes are applied a lever 576 is pulled manually or by other means such as an air booster or hydraulic cylinder. This lever has an arm which is mounted on a fixed pivot and is joined to a second lever 578 by another pivot. This lever has an arm 580 which is pivoted to slidable sleeve member 572 by means of a fork or yolk 582 which fits into a groove of a sliding member 572 allowing it to be slidably moved along the shaft 552. The elbow or mid-joint of the levers is forced in order to straighten out the links and press the swash plate against the angle groove in the shaft. When the swash plate is pressed against the angle groove the knee goes slightly past center and locks into position. The knee has stop lugs to prevent it from going too far past center.

The kinetic energy of the system is converted to heat and expelled through cooling fins or a radiator. To release the brake, the clutch is released and the shut-off valve 516 and associated valves such as valve 537 are opened.

The size of the damper in any of the embodiments can be reduced by placing a lever 596 between the outer ring 504 of the swash plate 500 and the dampers. This makes the lever action of the swash plate into a compound lever action as is shown in FIG. 16. The use of the compound lever 540 requires a smaller force through a greater distance to stop the reciprocating action in braking.

An optional drive for an energy storage device 590 such as a generator or flywheel is shown in FIGS. 13 and 14. The device 590 preferably comprises a double internal tooth rack 592 which is secured to one end of ring 504 and a half pinion 594 secured to a drive shaft 596 by key means (not shown).

The reciprocating motion of ring 504 drives the double rack 592 back and forth causing a reciprocating motion in the double rack thereby driving the half pinion 594 and associated drive shaft 596 in one direction activating the rotary motion of the energy storing device such as a flywheel or generator which is not shown. When the drive is used, it is first engaged and when enough energy is stored, it is disengaged by any suitable clutch mechanism and the brake is then operated in the manner mentioned before. This allows much of the energy of braking to be stored for future use and reduces the amount of heat to be carried away and dissipated.

A novel combined clutch and torque converter mechanism 600 as shown in FIG. 22 can also be used with the invention in place of the clutch mechanism previously discussed or in combination with the clutch mechanism to drive the dampers or to disengage the braking dampers when not needed. The mechanism 600 reduces the torque produced by the wheels or axle 502 by placing an overdrive gear train between the rotating wheel or drive shaft and the braking dampers. Thus, the torque carried from the wheels to the braking dampers can be reduced by division to any desired level in order to allow the use of smaller braking dampers.

The mechanism 600 basically comprises a centrally mounted cog wheel commonly called the sun wheel and one or more other cog wheels called planet wheels which engage with it and also engage an internal tooth ring. In the preferred construction the mechanism comprises a planet carrier drive shaft 602 having mounted on one end a planet gear carrier 604 which carries a plurality of rotatable planet gears 606. The planet carrier 604 is preferably keyed to the shaft 602 which carries torque from the wheels through an axle or shaft geared to the wheels as a drive shaft. A suitable torque transmitting means which can be utilized in the invention consists of two pinion gears, one of which is mounted on the planet carrier drive shaft 602 so that the rotation of the wheel axle drives the first pinion gear and the engaged meshed second pinion gear which is mounted to drive shaft 602 to drive the planet carrier shaft. A toothed ring gear 608 is mounted around the planet gears with its internal teeth 609 engaging the teeth of the planet gears 606 allowing the planet gears to rotate around the inside of the toothed ring. A sun gear 610 is mounted inside the ring gear 608 in engagement with the planet gears. The sun gear 610 is secured to a swash plate drive axle 612 and rotates the axle when it is rotated. A swash plate (not shown) but of similar configuration to the swash plates previously shown and described is mounted on the swash drive axle 612 as has been previously described and is adapted to drive a damper mechanism of the previously shown embodiments. The sun gear is keyed to the shaft which drives the swash plate or crank shaft which is attached to the braking dampers. A clutch band 614 is loosely mounted around the ring gear 608 and is connected with suitable closure means such as a hydraulic piston means which when activated by the operator closes the band 614 tightly around the outside surface of the ring gear.

Normally the wheels driving the planet gears 606 would cause the sun gear to revolve, but the load inertia of the sun gear which is connected to the dampers holds it motionless so that the ring gear is free to turn. The spinning planet gears will simply turn the ring gear around with no torque being applied to the dampers. When the clutch band 614 is locked around the ring gear by activating the closure means the ring gear is locked against rotation and the revolving planet gears rotate around inside it driving the sun gear which in turn drives the swash plate and associated braking dampers. It should be noted that when the band is initially locked around the ring gear that since the damper valves are open, the dampers will begin to pump without resistance and there will be no wear on the clutch band.

The clutch and torque mechanism does more than transmit and control power; it also divides the torque. In the mechanism described where a sun gear has a dimension of one inch, the planet gears have a dimension of one-half inch and the ring gear an inside dimension of two inches, the sun gear will make three revolutions to one of the planet carrier. This means a three to one speed increase and a decreasing of the torque to one-third of the original. It can thus be seen that the clutch and torque converter mechanism 600 is a valuable modification of the invention.

While the preferred embodiment of the invention has been disclosed, it is understood that the invention is not limited to such an embodiment since it may be otherwise embodied in the scope of the appended claims.

What is claimed is:

1. A brake apparatus comprising a drive shaft, a movable swash plate mounted on said drive shaft and adapted to rotate with said drive shaft, said swash plate defining an angular position with respect to said drive shaft so that when said drive shaft rotates, said swash plate rotates in a wobbling manner, a ring drive means mounted on said swash plate a first piston means positioned on one side of said ring drive means and connected to said ring drive means, said first piston means comprising a piston chamber, a piston slidably mounted in said piston chamber and a connecting rod having one end secured to said piston, and the other end being secured to said ring drive means, a second piston means positioned on the other side of said ring drive means and connected to said ring drive means opposite said first piston means, said second piston means comprising a piston chamber, a piston slidably mounted in said piston chamber and a connecting rod having one end secured to said piston and the other rod end secured to said ring drive means, a fluid conduit means connecting said first piston chamber with said second piston chamber to form a closed fluid flow path, valve means mounted to said fluid conduit means, said valve means being adapted to restrict the flow of fluid through said fluid conduit means and stop said swash plate and drive shaft from rotating and drive converter means secured to said ring drive means, said drive converter means comprising a first member secured to said ring drive means and adapted to be linearly driven and a second assembly rotatably mounted to said first member so that when said first member is linearly moved said second assembly is rotatably driven thereby storing energy to aid in driving said drive shaft.

2. A brake apparatus comprising a first piston means and second piston means connected to each other and communicating with each other by fluid conduit means, each piston means comprising a piston housing, a piston slidably mounted in said housing and a connecting rod secured to said piston, at least one vortex amplifier placed in said fluid conduit means to control the flow of fluid through said fluid conduit means, a by pass conduit connected to said fluid conduit means with each end of said by pass conduit communicating with said fluid conduit means on the opposite sides of each said vortex amplifier and valve means positioned on said by pass conduit, said valve means being positioned on said by pass conduit and adapted to shut off the flow of fluid through said by pass conduit, a stop valve placed in said fluid conduit means, said stop valve being adapted to selectively prevent the flow of fluid through said fluid conduit means, a ring member interposed between and secured to the connecting rods of said first and second piston means, said ring member being rotatably mounted on a rotatable swash plate which is movably mounted on a drive shaft, said rotatable swash plate being adapted to cause said ring member to reciprocate and drive said first and second piston means, said drive shaft being connected to at least one wheel, a second drive means connected to and operated by said ring member, said second drive means being adapted to convert the reciprocating motion of said ring member into rotary motion of a drive storage means.

3. A brake apparatus comprising a drive shaft, a movable swash plate mounted on said drive shaft and adapted to rotate with said drive shaft, said swash plate defining an angular position with respect to said drive shaft so that when said drive shaft rotates, said swash plate rotates in a wobbling manner, a ring drive means rotatably mounted on said swash plate, a second drive means connected to said ring drive means, said second drive means comprising a toothed rack secured to said ring drive means, a pinion gear mounted in said toothed rack by a shaft connected to said pinion gear and drive storage means connected to said pinion shaft, said rack being reciprocated by said ring drive means to rotate said pinion gear and associated shaft thereby storing energy in said drive storage means to aid in driving said drive shaft, a first piston means positioned on one side of said ring drive means and connected to said ring drive means, said first piston means comprising a piston chamber, a piston slidably mounted in said piston chamber and a connecting rod having one end secured to said piston, and the other end being secured to said ring drive means, a second piston means positioned on the other side of said ring drive means and connected to said ring drive means opposite said first piston means, said second piston means comprising a piston chamber, a piston slidably mounted in said piston chamber and a connecting rod having one end secured to said piston and the other rod end secured to said ring drive means, a fluid conduit means connecting said first piston chamber with said second piston chamber to form a closed fluid flow path, valve means mounted to said fluid conduit means, said valve means being adapted to restrict the flow of fluid through said fluid conduit means and stop said swash plate and drive shaft from rotating.

4. A brake apparatus as claimed in claim 3 wherein said valve means is contained in a heat transfer casing.

5. Apparatus according to claim 3 wherein said drive storage means comprises a flywheel.

6. A brake apparatus as claimed in claim 3 including a radiator apparatus mounted to said fluid conduit means to cool the fluid contained in said fluid conduit means.

* * * * *